(12) United States Patent
Kawaoka

(10) Patent No.: US 7,099,022 B1
(45) Date of Patent: Aug. 29, 2006

(54) PRINTING SYSTEM

(75) Inventor: Yoshiki Kawaoka, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1077 days.

(21) Appl. No.: 09/703,625

(22) Filed: Nov. 2, 2000

(30) Foreign Application Priority Data

Nov. 5, 1999 (JP) .................................. 11-315261

(51) Int. Cl.
G06K 15/00 (2006.01)
G06K 1/00 (2006.01)

(52) U.S. Cl. ...................................... 358/1.14; 358/1.9

(58) Field of Classification Search ................ 358/1.14, 358/1.15, 1.13, 1.18, 1.6, 1.2, 501, 504, 521, 358/522, 3.02, 3.07, 3.23, 3.1, 3.13, 3.27, 358/537, 452, 296

See application file for complete search history.

(56) References Cited

U.S. PATENT DOCUMENTS 5,784,149 A    7/1998  Kawaoka ..................... 355/35
5,828,461 A *  10/1998 Kubo et al. .................. 358/296
5,852,503 A    12/1998 Kawaoka ..................... 358/527
5,978,008 A *  11/1999 Crawford et al. ........... 347/230

FOREIGN PATENT DOCUMENTS

JP    7-248544 A    9/1995
JP    09319015 A   12/1997
JP    10-63859 A    3/1998

* cited by examiner

Primary Examiner—Douglas Q. Tran
(74) Attorney, Agent, or Firm—Birch, Stewart, Kolasch & Birch, LLP

(57) ABSTRACT

A printing system comprises an evaluating device (CPU) that evaluates a quality of an image to be printed according to inputted image data and a displaying device that displays the evaluation on the evaluating device. Therefore, the printing system can inform the user of the evaluation due to the exposure.

8 Claims, 6 Drawing Sheets

| EVALUATION (MARK) \ ITEM | EXTREME OVEREXPOSURE LESS THAN 40 | OVEREXPOSURE 40 ~ 60 | OVEREXPOSURE 60 ~ 80 | CORRECT EXPOSURE 80 ~ 100 | UNDER-EXPOSURE 60 ~ 80 | UNDER-EXPOSURE 40 ~ 60 | EXTREME UNDER-EXPOSURE LESS THAN 40 |
|---|---|---|---|---|---|---|---|
| WHITE BALANCE COMPENSATION | X | O | O | O | O | O | X |
| BRIGHTNESS COMPENSATION | X | O | O | O | O | O | X |

X: PROHIBIT PRINTING
O: PERMIT PRINTING

F I G. 9

| EVALUATION (MARK) ITEM | EXTREME OVEREXPOSURE LESS THAN 40 | OVEREXPOSURE 40~60 | OVEREXPOSURE 60~80 | CORRECT EXPOSURE 80~100 | UNDER-EXPOSURE 60~80 | UNDER-EXPOSURE 40~60 | EXTREME UNDER-EXPOSURE LESS THAN 40 |
|---|---|---|---|---|---|---|---|
| WHITE BALANCE COMPENSATION | × | ○ | ○ | ○ | ○ | ○ | × |
| BRIGHTNESS COMPENSATION | × | ○ | ○ | ○ | ○ | ○ | × |

×: PROHIBIT PRINTING
○: PERMIT PRINTING

PRINTING SYSTEM

BACKGROUND OF THE INVENTION

1. Field of the Invention

This invention relates to a printing system, and more particularly to a printing system, provided in a store, an amusement facility or the like, that a user operates by himself of herself.

2. Description of Related Art

Generally, an apparatus that prints images from a silver halide film automatically compensates the exposure for printing, and it does not print images with extreme underexposure or overexposure.

Japanese patent provisional publication No. 9-319015 discloses a color image generating method and an image generating apparatus that generates a color image by well reproducing colors from a negative color film without a user and displays the image on a CRT.

In the color image generating method and the image generating apparatus, however, the image can be inputted from a silver halide film, and it does not inform the user of a compensation amount of the image quality.

SUMMARY OF THE INVENTION

It is therefore an object of the present invention to provide a printing system that can inform a user of an evaluation of an image quality due to exposure.

To achieve the above object, the present invention provides a printing system that prints an image according to inputted image data, the printing system comprising: an evaluating device that performs evaluation of a quality of the image to be printed according to the inputted image data; and a displaying device that displays a result of the evaluation on the evaluating device.

According to the present invention, the printing system comprises an evaluating device that evaluates the quality of the image to be printed according to the inputted image data and a displaying device that displays the evaluation on the evaluating device. Therefore, the printing system can inform the user of the evaluation due to the exposure.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 9 is a table showing evaluations displayed according to the compensation amounts and whether printing is permitted or prohibited.

DETAILED DESCRIPTION OF THE PREFERRED EMBODIMENT

This invention will be described in further detail by way of example with reference to the accompanying drawings.

Figure 1:
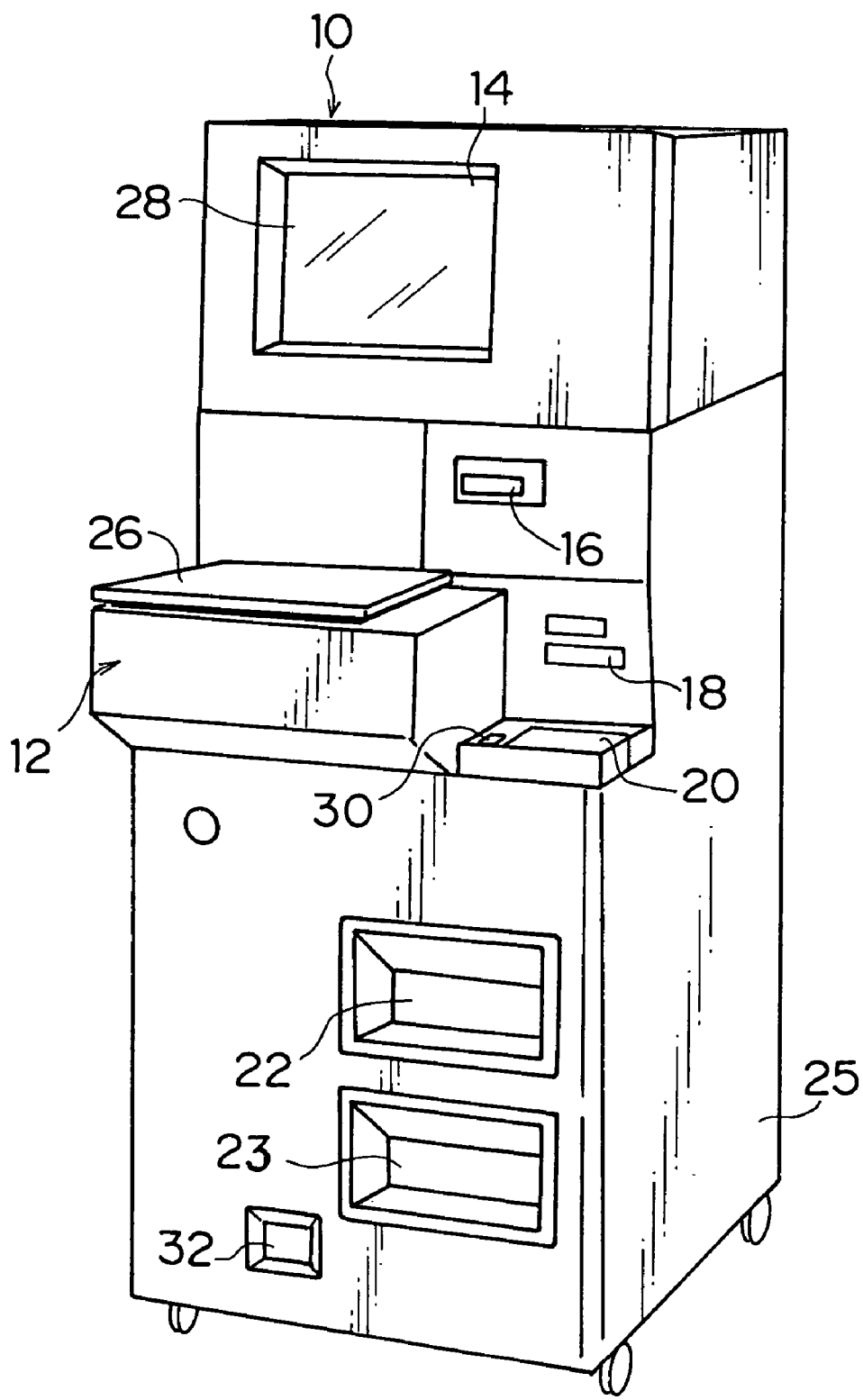
FIG. 1 is a perspective view showing an embodiment of a printing system according to the present invention.

FIG. 1 is a perspective view showing an embodiment of a printing system 10 according to the present invention.

As shown in FIG. 1, the printing system 10 comprises a flat bed scanner 12 that inputs original images, a displaying device 14, a floppy disc drive 16 in which a floppy disc storing original images is loaded, a memory card inserting part 18, a film scanner 20, and printers 22 and 23. These components are incorporated in a casing 25.

The flat bed scanner 12 is used to input the image and characters. The flat bed scanner 12 is composed of a glass plate on which pictures (the original images) and a manuscript of handwritten characters or the like are placed, a light source, an image sensor that converts an optical image into electrical signals, and an optical system that guides a light from the picture or the manuscript to the image sensor. When the original images are to be inputted from the pictures or the characters are to be inputted from the manuscript, a cover 26 of the flat bed scanner 12 is opened and the pictures or the manuscript is placed on the glass plate.

The displaying device 14 has a CRT display or a liquid crystal display, and displays an original image to be compensated, a compensated and composed image, index images, the operation procedure and a warning. The displaying device 14 has a touch panel 28 for selecting a template image or a standard message and inputting characters. The user inputs and selects various items by touching the touch panel 28 in accordance with guidance displayed on the display.

The floppy disc drive 16 is used to input image data produced by a personal computer and stored in the floppy disc. When a recording medium such as a PC card and a smart media storing image data obtained by a digital camera is loaded in the memory card inserting part 18, the image data is read from the recording medium. The recording medium may be a flash memory card, an IC card, a floppy disc, a magneto-optical disc (MO), a stick memory, or the like, and the memory card inserting part 18 has a driver for the recording medium.

The film scanner 20 is used to input original images from a cartridge film of the 24 mm advanced photo system (APS). When the developed cartridge film is loaded in an inserting part of the film scanner 20, the film is automatically wound and an image sensor (not shown) converts the film image into electronic image data. A film scanner for a 35 mm film or the like may be provided.

The printers 22 and 23 are thermo-auto chrome (TA) method, and they print on rolled papers. The upper printer 22 prints on an A5 or A6 general paper, and the lower printer 23 prints on an adhesive label paper with an adhesive layer on one side covered with a released paper. After the printing, a paper cutting device cuts the paper to a predetermined length, and then the print is ejected from one of ejectors of the printers 22 and 23 or the prints are ejected from both ejectors.

The printing system 10 in FIG. 1 is provided in a store or the like, and the user operates the printing system 10 by himself of herself to acquire the print. The user inputs the original images from the flat bed scanner 12 or the like, selects the template image and inputs the characters in accordance with guidance displayed on the displaying device 14. The compensated image is composed of the template image, the characters and the original image to be compensated displayed on the displaying device 14, and then the compensated and composed image is displayed on the displaying device 14. The user inserts coins into a coin slot 30 to pay the charge determined according to the type of the print, and then the compensated and composed image is printed and the print is ejected. The reference numeral 32 in FIG. 1 denotes a coin return bucket.

Figure 2:
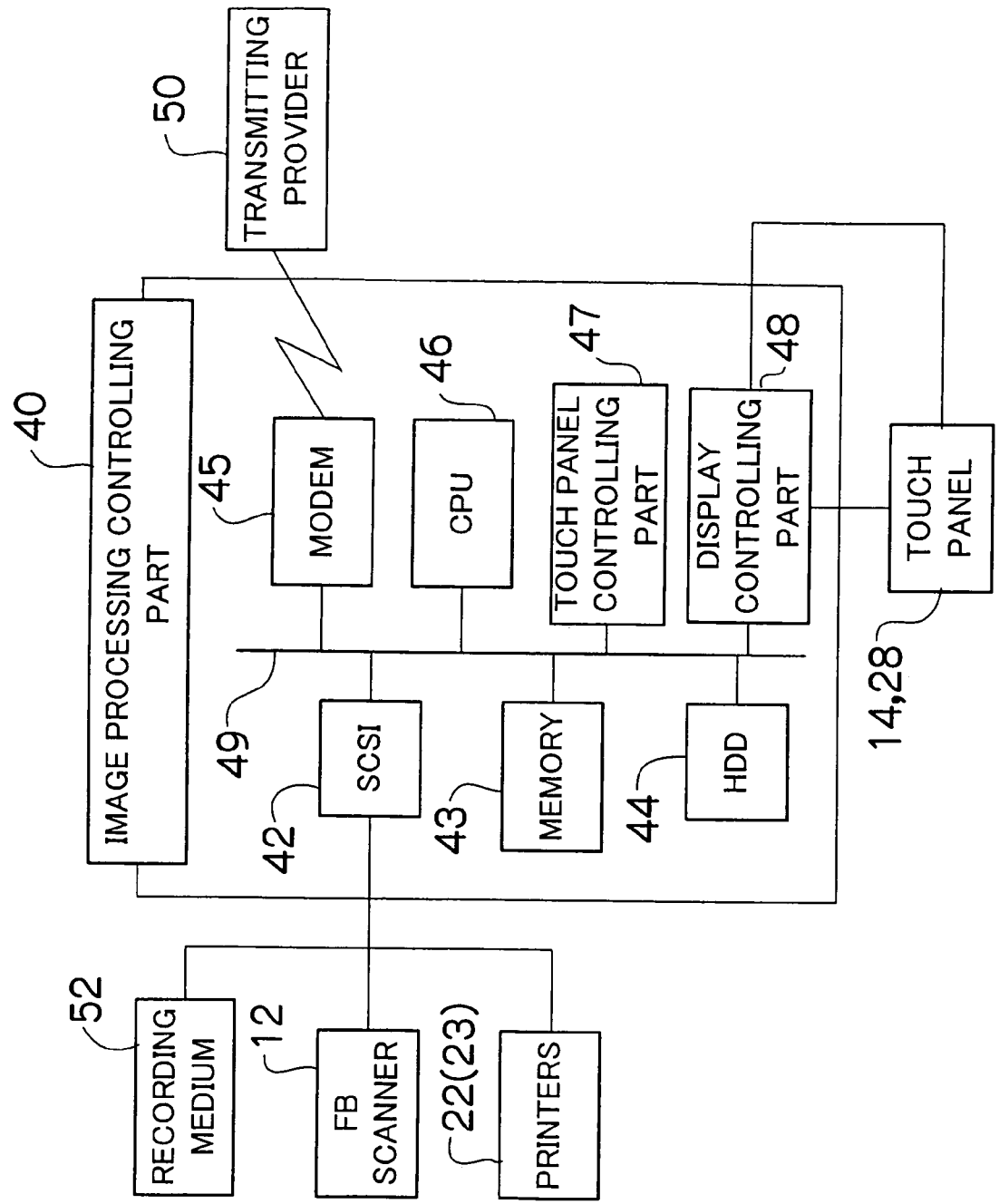
FIG. 2 is a block diagram showing the structure of the printing system.

FIG. 2 is a block diagram showing the structure of the printing system 10 in FIG. 1. As shown in FIG. 2, an image processing controlling part 40 comprises an SCSI interface part 42 that outputs the composed image to the printers or the outside and inputs image data from the recording medium 52, a memory 43, a hard disc drive 44, a modem 45, a central processing unit (CPU) 46, a touch panel controlling part 47 and a display controlling part 48, and the components 42–48 are connected to a bus 49. The CPU 46 performs various calculations and determinations, compensates and evaluates image quality, permits and prohibits printing, and controls the whole printing system 10. The CPU 46 also selects the standard message and the template image, and composes the image.

The image processing controlling part 40 is connected to the flat bed scanner 12, the printers 22 and 23 and the recording medium 52 such as the PC card and the smart media through the SCSI interface part 42. The film scanner 20 (not shown in FIG. 2) can be connected to the SCSI interface part 42.

The display controlling part 48 controls the displaying device 14, and the touch panel controlling part 47 controls the touch panel 28.

The hard disc drive 44 stores a control program for the system, data (template data) on templates, data on messages, operation formulas for the image quality compensation, and constants used at the operation, such as a compensation limit. The template data and the data on the messages can be updated with a CD-ROM, a communication or the like.

The printing system 10 can be connected to a transmitting provider 50 through the modem 45, and the printing system 10 can receive data from a cellular phone (not shown) and transmit data to an outside apparatus such as a network server.

The operation of the above-described printing system 10 will now be explained.

The user sets the processing by selecting desired items from items displayed on the displaying device 14 that is a user interface of the printing system 10.

Figure 3:
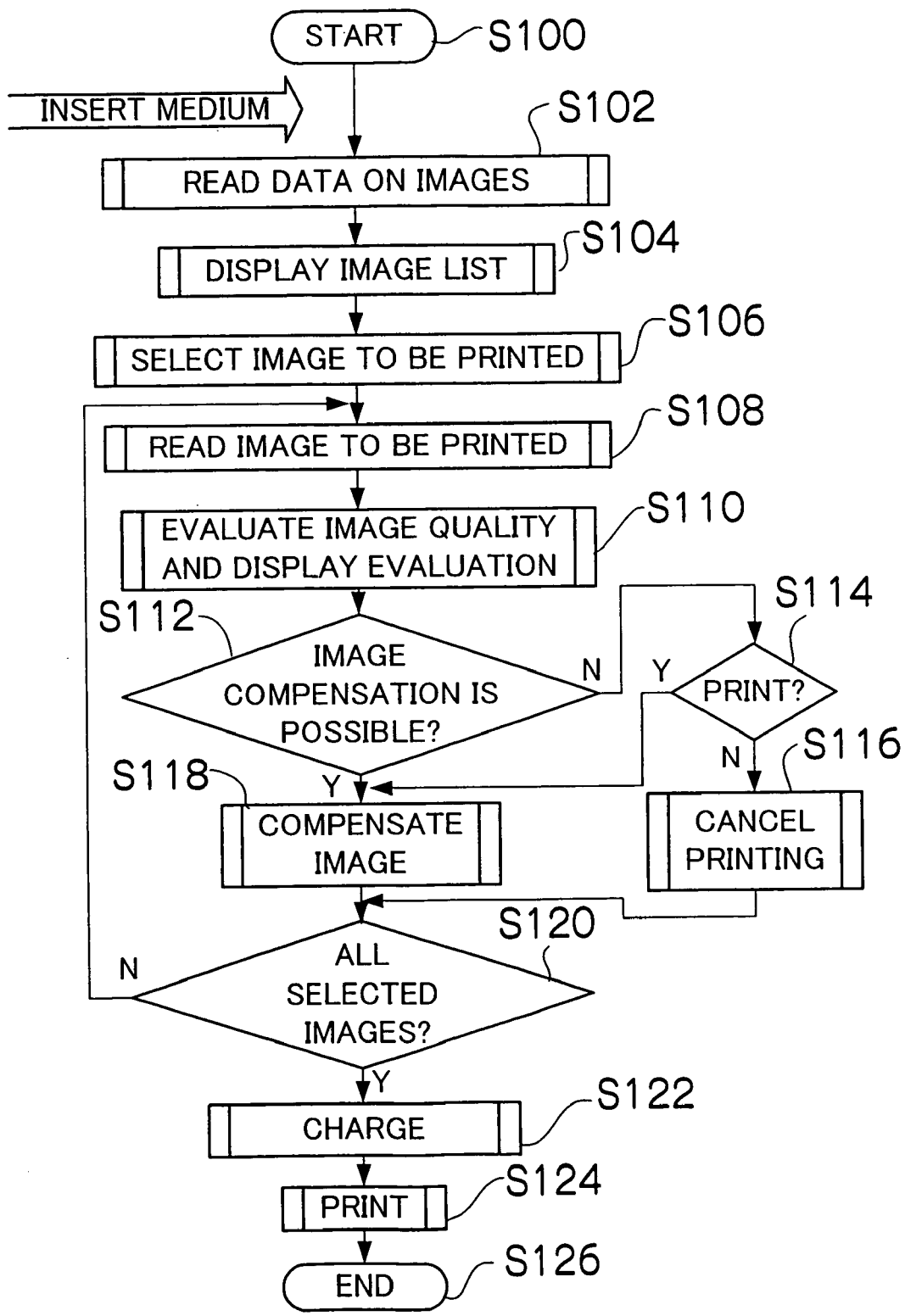
FIG. 3 is a flow chart showing an image quality compensating processing.

FIG. 3 is a flow chart showing the image quality compensating processing.

As shown in FIG. 3, after the processing starts at the step 100 of "START," the user starts inputting the original images. The CPU 46 reads information on the original images and the index images in accordance with the control program at the step 102 of "READ DATA ON IMAGES."

Then, the CPU 46 displays the index images and the information such as file names and comment data on the displaying device 14 at the step 104 of "DISPLAY IMAGE LIST."

At the step 106 of "SELECT IMAGE TO BE PRINTED," the user selects the image to be printed with the touch panel 28 according to the index images and the information. Then, the CPU 46 reads the selected image to be printed at the step 108 of "READ IMAGE TO BE PRINTED."

Next, the CPU 46 calculates compensation amounts for evaluating white balance and brightness of the image, compensates color balance and exposure, and displays an evaluation on the displaying device 14 according to the calculated compensation amounts. The CPU 46 may inform the user of the evaluation by voice or the like instead of displaying it on the displaying device 14.

The method of calculating the compensation amounts will now be explained.

First, the CPU 46 produces a histogram of gradation, color or brightness information of the selected image or its index image. In case of "UNDEREXPOSURE," the CPU 46 compensates the exposure to raise the brightness. In case of "OVEREXPOSURE," the CPU 46 compensates the exposure to lower the brightness. FIGS. 4, 5, 6, 7 and 8 show histograms.

FIGS. 4–8 are graphs showing relationships between numbers of pixels and brightness (or gradation) of one of R, G and B or combined R, G and B.

Figure 4:
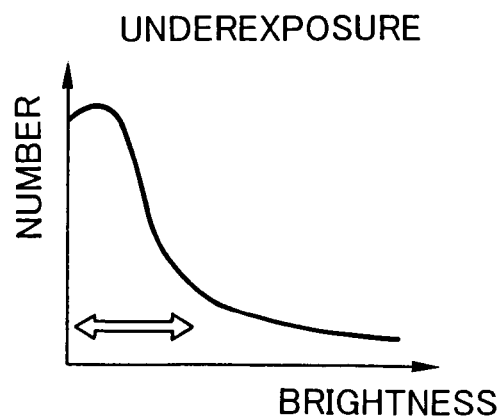
FIG. 4 is a histogram in which a large percentage of pixels are dark.
Figure 5:
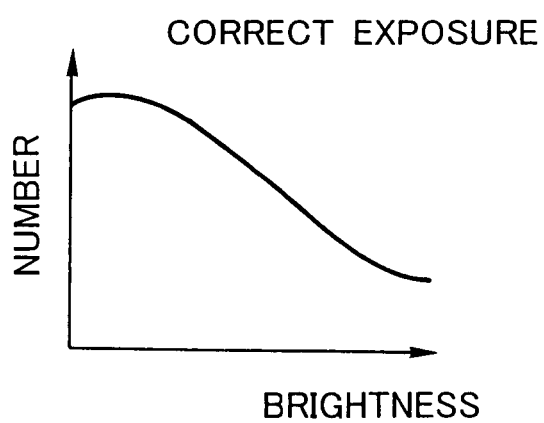
FIG. 5 is a histogram after an image quality is compensated in which the large percentage of the pixels are dark.

FIG. 4 is a histogram in which a large percentage of the pixels are dark (underexposure). In this case, the CPU 46 compensates the data so that the relationship between the number of the pixels and the brightness is that shown in FIG. 5. The CPU 46 evaluates the image quality according to the compensation amount, and displays the evaluation or the warning showing that the compensation amount is so large that the image can not be printed. If the average brightness of the histogram is too low, the gradation needs to be considerably compensated. But, if the gradation is extremely compensated, the gradation is rough and the image quality is poor. Thus, a limit of the compensation amount is previously determined, and the printing is prohibited if the compensation amount exceeds the limit.

Figure 6:
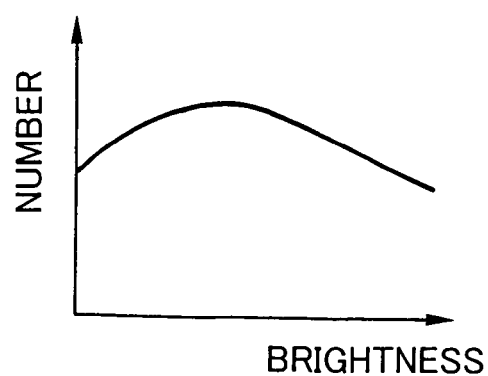
FIG. 6 is a histogram in case of correct exposure.

FIG. 6 is a histogram in which the average of the brightness is in the middle of a dynamic range of the brightness. In this case, the CPU 46 determines that the exposure is correct and does not compensate the exposure. The gradation is compensated so that the histogram is that in FIG. 6.

Figure 7:
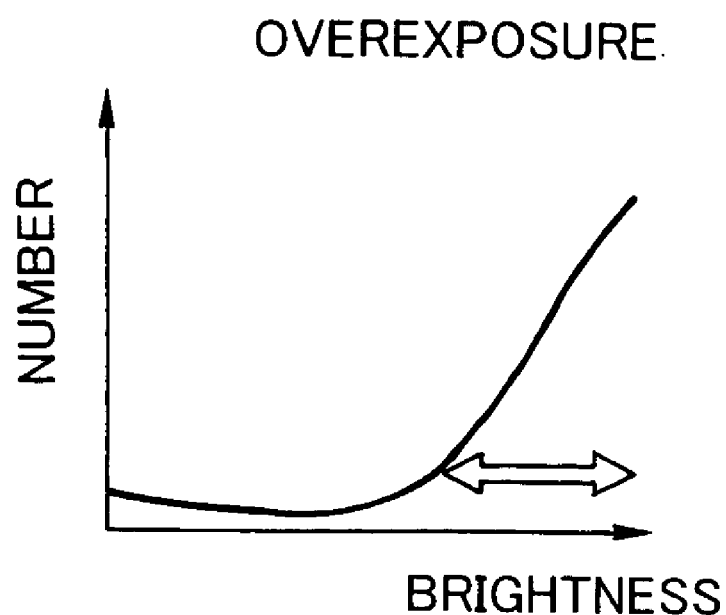
FIG. 7 is a histogram in which a large percentage of pixels are bright.
Figure 8:
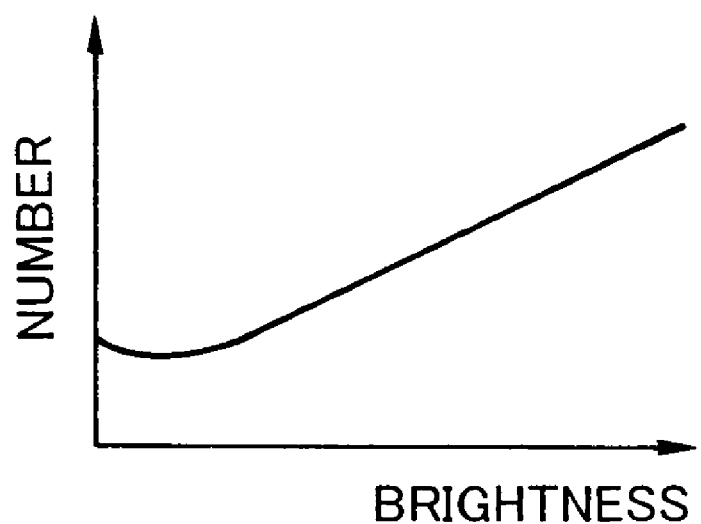
FIG. 8 is a histogram after an image quality is compensated in which the large percentage of the pixels are bright.

FIG. 7 is a histogram in which a large percentage of the pixels are bright (overexposure). In this case, the CPU 46 compensates the data so that the relationship between the number of the pixels and the brightness is that shown in FIG. 8. The CPU 46 evaluates the image quality according to the compensation amount, and displays the evaluation or the warning showing that the compensation amount is so large that the image can not be printed.

Then, the CPU 46 compensates the white balance to compensate the color so that the brightness balances of R, G and B are equal, and evaluates the image quality according to the compensation amounts, and displays the evaluation or the warning showing that the compensation amount is so large that the image can not be printed. Since gray is evident when R, G and B colors of a general subject are combined, the compensation amounts are calculated so that gray is evident when the R, G and B colors are combined.

At the step 112 of "IMAGE COMPENSATION IS POSSIBLE?" in FIG. 3, the CPU 46 determines whether or not all the compensation amounts are smaller than the limit. If no, the user determines whether to print the image even though the brightness can not be compensated at the step 114 of "PRINT?". If the user determines not to print the image, the CPU 46 sets a flag showing the image is not to be printed at the step 116 of "CANCEL PRINTING," and the processing goes to the step 120 of "ALL SELECTED IMAGES?".

If yes at the step 112, the image is compensated with the calculated compensation amount at the step 118 of "COM- PENSATE IMAGE." If the user determines to print the image at the step 114, the processing also goes to the step 118.

After step 118, the CPU 46 determines whether or not all the images selected at the step 106 have been read. If no, the processing returns to the step 108 to read a remaining image. If yes, the processing goes to the step 122 of "CHARGE."

At the step 122, the CPU 46 displays the charge on the displaying device 14 according to the number and the size of the prints. The user inserts the coins into the coin slot 30, and then selects the template image and inputs characters for decoration as need arises. Next, the compensated image data is transmitted to the printers 22 and 23, which print and eject the images at the step 124 of "PRINT."

FIG. 9 is a table showing evaluations displayed according to the compensation amounts for the white balance compensation and the brightness compensation and whether printing is permitted or prohibited.

As shown in FIG. 9, if the compensation amount of the histogram exceeds the limit, an evaluation of "EXTREME OVEREXPOSURE" or "EXTREME UNDEREXPOSURE" and a low mark of less than 40 are displayed and the printing is prohibited. If the compensation amount of the histogram is the limit or smaller, an evaluation of "OVEREXPOSURE" or "UNDEREXPOSURE" and a mark of between 40 and 80 are displayed and the printing is permitted. If the histogram barely needs to be compensated, an evaluation of "CORRECT EXPOSURE" and a high mark of between 80 and 100 are displayed.

The image data is read from the medium such as the memory card in the above explanation, but this invention is not limited to this. The image may be read from a magnetic recording medium such as the floppy disc or an optical recording such as a CD, and the image may be downloaded with a communicating device, and the it may be inputted from the picture with the flat bed scanner 12. The highest mark is 100 in the above explanation, but this invention is not limited to this.

According to the present invention, the printing system comprises an evaluating device that evaluates the quality of the image to be printed according to the inputted image data and a displaying device that displays the evaluation on the evaluating device. Therefore, the printing system can inform the user of the evaluation due to the exposure.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing system that prints an image according to inputted image data supplied by a consumer, said printing system comprising:

an evaluating device that performs evaluation of a quality of the image to be printed according to the inputted image data and automatically corrects at least one of white balance or brightness of the image;

a compensating device for automatically compensating the input image data according to the evaluation performed by the evaluation device;

a displaying device that displays on a screen shot an evaluation result on said evaluating device; and a printer printing the automatically corrected image.

2. The printing system as defined in claim 1, wherein said evaluating device comprises:

a calculating device that calculates at least one of a gradation compensation amount and a color compensation amount according to the inputted image data; and a device that evaluates the quality of the image according to the compensation amount calculated by said calculating device.

3. The printing system as defined in claim 2, wherein the compensating device produces new image data for printing from the inputted image data according to the compensation amount calculated by said calculating device.

4. The printing system as defined in claim 3, further comprising:

a determining device that determines whether or not the compensation amount calculated by said calculating device exceeds a compensation limit; and a warning device that warns that the image can not be finely printed if said determining device determines that the compensation amount exceeds the compensation limit.

5. The printing system as defined in claim 4, further comprising a prohibiting device that automatically prohibits the printing if said determining device determines that the compensation amount exceeds the compensation limit.

6. The printing system as defined in claim 4, further comprising a selecting device in which a consumer manually selects whether to permit or prohibit the printing if said determining device determines that the compensation amount exceeds the compensation limit.

7. The printing system as defined in claim 1, wherein the inputted image data supplied by a consumer is performed by scanning an original image with a scanning device.

8. The printing system as defined in claim 1, wherein the image that is automatically corrected of at least one of white balance or brightness is an underexposed or overexposed image.

* * * * *